United States Patent
Liang et al.

(10) Patent No.: US 11,081,103 B2
(45) Date of Patent: Aug. 3, 2021

(54) SPEECH RECOGNITION METHOD, APPARATUS, AND COMPUTER READABLE STORAGE MEDIUM

(71) Applicant: PING AN TECHNOLOGY (SHENZHEN) CO., LTD., Guangdong (CN)

(72) Inventors: Hao Liang, Guangdong (CN); Ning Cheng, Guangdong (CN); Jianzong Wang, Guangdong (CN); Jing Xiao, Guangdong (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 45 days.

(21) Appl. No.: 16/642,371

(22) PCT Filed: Nov. 28, 2017

(86) PCT No.: PCT/CN2017/113230
§ 371 (c)(1),
(2) Date: Feb. 27, 2020

(87) PCT Pub. No.: WO2019/080248
PCT Pub. Date: May 2, 2019

(65) Prior Publication Data
US 2021/0074264 A1    Mar. 11, 2021

(30) Foreign Application Priority Data
Oct. 23, 2017 (CN) .......................... 201710994268.5

(51) Int. Cl.
*G10L 15/22* (2006.01)
*G10L 15/06* (2013.01)
*G10L 15/02* (2006.01)
*G10L 15/16* (2006.01)
*G10L 15/18* (2013.01)

(52) U.S. Cl.
CPC .............. *G10L 15/06* (2013.01); *G10L 15/02* (2013.01); *G10L 15/16* (2013.01); *G10L 15/18* (2013.01)

(58) Field of Classification Search
CPC .......... G10L 15/22; G10L 15/16; G10L 15/02
See application file for complete search history.

(56) References Cited

U.S. PATENT DOCUMENTS

2017/0148433 A1* 5/2017 Catanzaro ............. G10L 15/183
2018/0121796 A1* 5/2018 Deisher ................ G06N 3/0472
2018/0330718 A1* 11/2018 Hori ........................ G06N 7/005

* cited by examiner

*Primary Examiner* — Jakieda R Jackson (57) ABSTRACT

Disclosed are a speech recognition method, apparatus, computer device and storage medium. The method includes: performing a framing and an acoustic feature extraction of a speech-information-to-be-tested according to a default rule to obtain a frame-level speech feature sequence; dividing the frame-level speech feature sequence into n blocks sequentially; inputting all blocks into a preset bidirectional LSTM-RNN model parallelly to obtain an output result of the corresponding neuron in an output layer of the preset bidirectional LSTM-RNN model corresponding to the forward recognition result and backward recognition result of each block to obtain a speech recognition result of the speech-information-to-be-tested. The present application can improve the speech recognition effect significantly and reduce the time delay of the speech decoding effectively.

15 Claims, 7 Drawing Sheets

SPEECH RECOGNITION METHOD, APPARATUS, AND COMPUTER READABLE STORAGE MEDIUM

This application claims all benefits of priority from Chinese Patent Application No. CN2017109942685, filed on Oct. 23, 2017, in the State Intellectual Property Office of China, entitled "Speech recognition method, apparatus, device, and computer readable storage medium" the content of which is hereby incorporated by reference.

Field of Invention

The present application relates to the field of computer technology, particularly to speech recognition methods, apparatus, device and computer readable storage medium.

BACKGROUND OF INVENTION

Description of the Related Art

Speech recognition also known as automatic speech recognition (ASR) is intended for changing voice signals into texts by the recognition and understanding of a machine, and thus it is an important branch of the present development of artificial intelligence. Speech recognition technology is a prerequisite for natural language processing and capable of promoting the development in areas related to voice control interaction effectively and provides tremendous convenience to our daily life such as smart home and voice input, so that instructions for executing certain operations can be carried out for people who are unsuitable to use their hands and eyes such as middle-aged and elderly people or in an environment or situation such as driving on a road. The accuracy of the speech recognition determines the effectiveness of technological applications. In recent years, the development of deep learning technology improves the speech recognition accuracy greatly.

Long Short-term Memory Recurrent Neural Network (LSTM-RNN) is believed to be a highly efficient and widely used deep learning framework in the area of speech recognition. LSTM can effectively overcome the problem of the conventional simple RNN training gradient disappearance by the traditional recurrent neural network (wherein a LSTM module introduced to the foundation of the RNN0 can overcome this problem effectively). In addition, the network structure of RNN allows the information of the time dimension in a speech timing sequence to be utilized. Compared with the traditional deep learning framework, the practicality and accuracy of this application can be improved significantly. When determining a current speech frame, a Bidirectional Long Short-term Memory (BLSTM) not just can use the "history" speech information effectively only, but also can use the "future" speech information" to dig up the original inputted speech feature more effectively, so as to obtain a more accurate decision. Although a great improvement on the accuracy has been achieved in the field of research, BLSTM still has inherent deficiency in practicality. Unlike the unidirectional LSTM, the decoder of the BLSTM has to wait for the whole sentence to be read before it can perform the bidirectional processing and calculation. In other words, the forward propagation for a reverse processing in the neural network has a great time delay. The longer the inputted speech, the greater the time delay. As a result, the real-time speech recognition becomes impossible.

SUMMARY OF THE INVENTION

The present application provides a speech recognition method, apparatus, device and computer readable storage medium capable of improving the speech recognition effect significantly and reducing the time delay of decoding the voice effectively to make the application of real-time speech recognition based on a bidirectional LSTM-RNN possible.

In a first aspect, the present application provides an embodiment of a speech recognition method comprising the steps of: performing a framing and an acoustic feature extraction of a speech-information-to-be-tested according to a default rule to obtain a frame-level speech feature sequence; dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block inputting all blocks into a preset bidirectional LSTM-RNN model parallel to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block; obtaining an output result of the corresponding neuron in an output layer of the preset bidirectional LSTM-RNN model corresponding to the forward recognition result and backward recognition result of each block to obtain a speech recognition result of the speech-information-to-be-tested; wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

In a second aspect, the present application provides an embodiment of a speech recognition apparatus comprising: a first processing unit, for performing a framing and an acoustic feature extraction of a speech-information-to-be-tested according to a default rule to obtain a frame-level speech feature sequence; a second processing unit, for dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block; a recognition unit, for inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block; and an output unit, for obtaining an output result of the corresponding neuron in an output layer of the preset bidirectional LSTM-RNN model corresponding to the forward recognition result and backward recognition result of each block to obtain a speech recognition result of the speech-information-to-be-tested; wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

In a third aspect (for vendors), the present application provides an embodiment of a speech recognition device comprising: a memory, for storing a program to achieve a speech recognition; and a processor, for executing the program stored in the memory to achieve the speech recognition and carrying out the method as described in the first aspect.

In another aspect, the present application further provides an embodiment of a computer readable storage medium, for storing one or more programs executed by one or more processors to carry out the method as described in the first aspect The present application adopts a time delay control method capable of using the "past" and "future" speech information in the bidirectional LSTM-RNN at the same time effectively, improving the recognition effect significantly, and recoding the time delay of decoding (because the preset bidirectional LSTM-RNN model can start processing immediately after a whole sentence is read), so as to make the application of real-time speech recognition based on the bidirectional LSTM-RNN possible.

BRIEF DESCRIPTION OF THE DRAWINGS

In order to more clearly illustrate the embodiments of the present application, accompanying drawings required for describing the embodiments are used for simple introduction. Apparently, these drawings are used for the description below for some embodiments of the present application only, and people having ordinary skill in the art can derive from other drawings from these drawings without creative efforts.

DESCRIPTION OF THE EMBODIMENTS

To make it easier for our examiner to understand the objective of the application, its structure, innovative features, and performance, we use an embodiment together with related drawings for the detailed description of the application.

Figure 1:
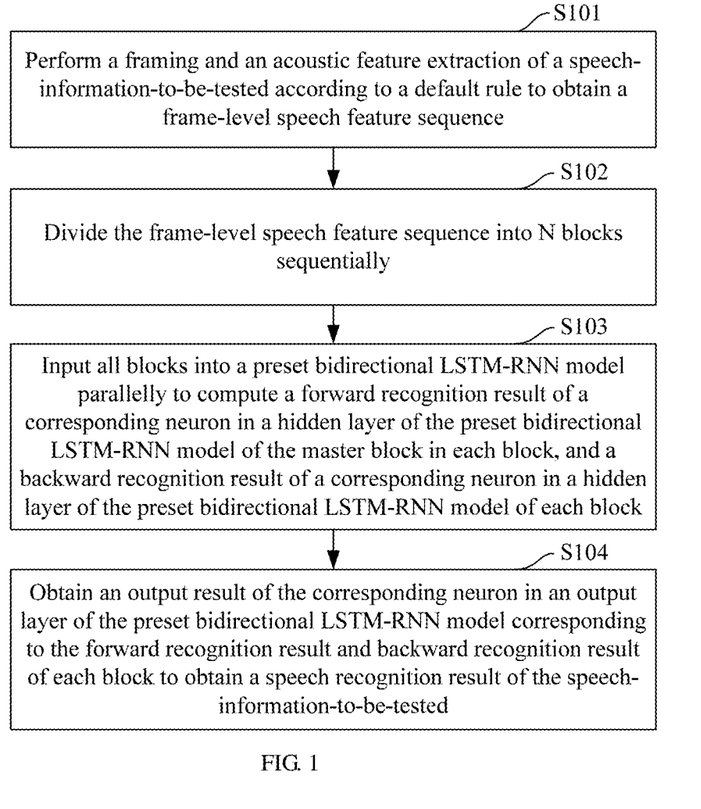
FIG. 1 is a flow chart of a speech recognition method in accordance with an embodiment of the present application.

With reference to FIG. 1 for a flow chart of a speech recognition method in accordance with an embodiment of the present application, the method may be applied in a terminal such as a smart phone (including an Android mobile phone, an IOS mobile phone, etc.), a Table PC, a notebook computer and a smart device. In FIG. 1, the method comprises the following steps S101~S104.

S101: Perform a framing and an acoustic feature extraction of a speech-information-to-be-tested according to a default rule to obtain a frame-level speech feature sequence. In an embodiment of the present application, the speech-information-to-be-tested is processed according to a preset rule to obtain a recognizable speech feature, which is the frame-level speech feature sequence. After the framing of the speech-information-to-be-tested is performed, it is still necessary to perform the acoustic feature extraction to obtain a frame-level speech feature sequence.

Figure 2:
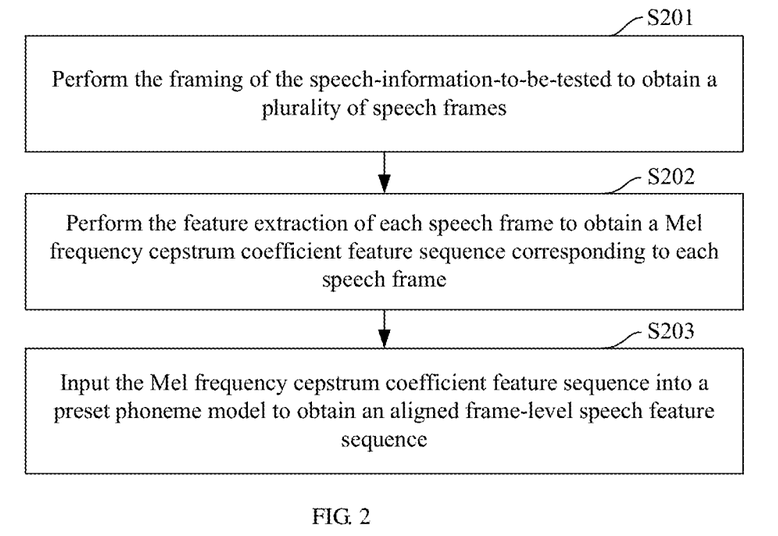
FIG. 2 is another flow chart of a speech recognition method in accordance with an embodiment of the present application.

In FIG. 2, the step S101 further comprises the following steps S201~S203.

S201: Perform the framing of the speech-information-to-be-tested to obtain a plurality of speech frames. In an embodiment of the present application, a paragraph of the speech-information-to-be-tested is arranged according to time sequentially. The framing of the speech-information-to-be-tested is performed to obtain the plurality of speech frames, wherein the time duration of each speech frame may be 10 ms~30 ms. In a certain embodiment, the time duration of each speech frame may be 25 ms, and the frame displacement is 10 ms.

S202: Perform the feature extraction of each speech frame to obtain a Mel frequency cepstrum coefficient feature sequence corresponding to each speech frame. In an embodiment of the present application, an ingredient with a recognizable feature is extracted from each speech frame after the framing process to obtain the Mel frequency cepstrum coefficient feature sequence corresponding to each speech frame. Specifically, all inputted speech frames are processed by a fast Fourier transform to calculate the logarithmic energy outputted by each filter bank. After the logarithmic energy is calculated, a Mel frequency cepstrum coefficient (MFCC) which is a MFCC acoustic feature can be obtained by a discrete cosine transform. In the meantime, the Mel frequency cepstrum coefficient feature sequence is outputted, wherein the Mel frequency cepstrum coefficient feature sequence is a feature sequence of "Dimension of MFCC× Number of framings".

S203: Input the Mel frequency cepstrum coefficient feature sequence into a preset phoneme model to obtain an aligned frame-level speech feature sequence. In an embodiment of the present application, the Mel frequency cepstrum coefficient feature sequence may be inputted into a preset phoneme model to obtain a corresponding frame-level speech feature sequence in order to improve the accuracy of the speech recognition. The phoneme model may be a hidden Markov model or a Gaussian mixed model, and the hidden Markov model and Gaussian mixed mode can be a decoding network model that uses present existing speech sample data for training, and the Mel frequency cepstrum coefficient feature sequence is processed by the aforementioned decoding network model to obtain a decoded result which is the frame-level speech feature sequence.

Figure 3:
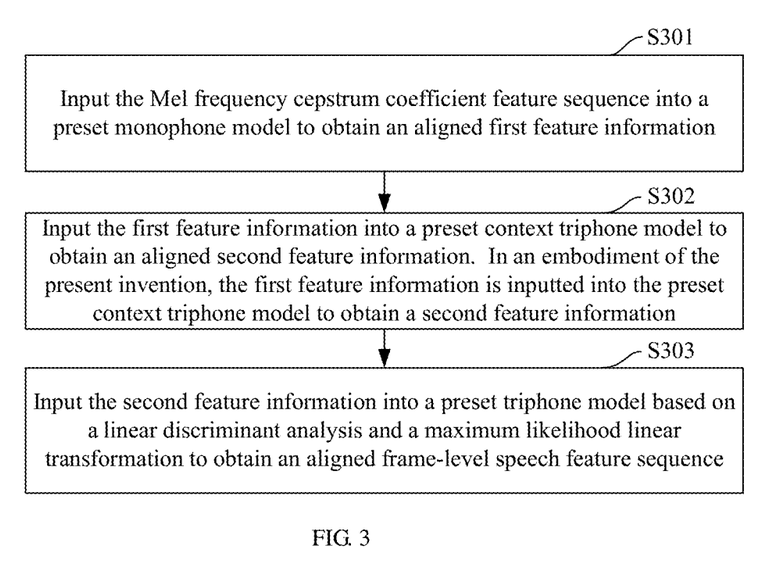
FIG. 3 is another flow chart of a speech recognition method in accordance with an embodiment of the present application.

In FIG. 3, the monophone model, the context triphone model and the triphone model based on the linear discriminant analysis and the maximum likelihood linear transformation are different preset hidden Markov models and Gaussian mixed models. The step S203 further comprises the following steps S301~S303.

S301: Input the Mel frequency cepstrum coefficient feature sequence into a preset monophone model to obtain an aligned first feature information. In an embodiment of the present application, the Mel frequency cepstrum coefficient feature sequence is inputted into the preset monophone model to obtain a first feature information, wherein the first feature information is relatively more accurate.

S302: Input the first feature information into a preset context triphone model to obtain an aligned second feature information. In an embodiment of the present application, the first feature information is inputted into the preset context triphone model to obtain a second feature information, wherein the second feature information is relatively more accurate.

S303: Input the second feature information into a preset triphone model based on a linear discriminant analysis and a maximum likelihood linear transformation to obtain an aligned frame-level speech feature sequence. In an embodiment of the present application, the second feature information is inputted into the preset triphone model based on the linear discriminant analysis and maximum likelihood linear transformation to obtain the final frame-level speech feature sequence, and the frame-level speech feature sequence is the acoustic feature included in the more accurate speech-information-to-be-tested, so as to facilitate a subsequent recognition and improve the accuracy of the recognition.

Figure 1A:
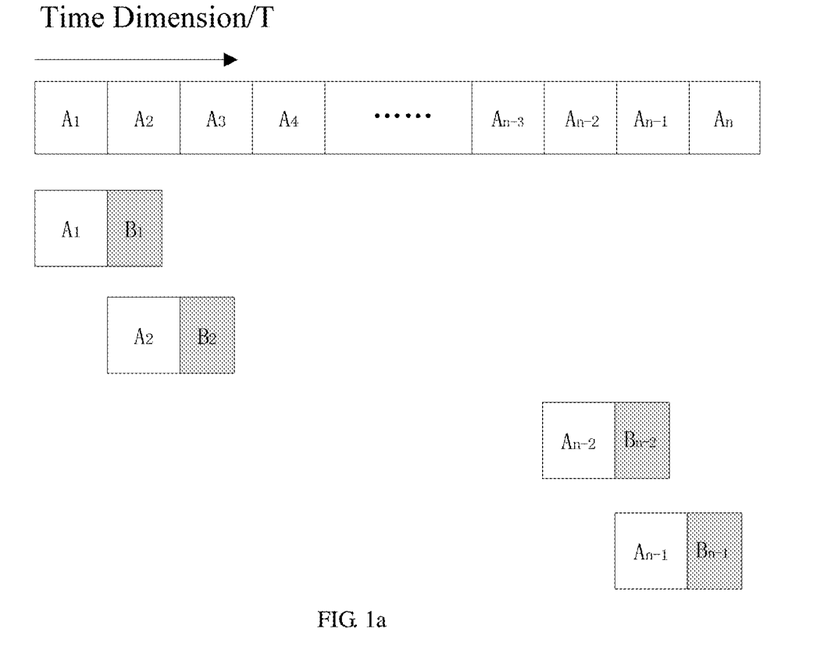
FIG. 1a is a schematic view showing the divided blocks of speech-information-to-be-tested in accordance with an embodiment of the present application.

S102: Divide the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block;

In an embodiment of the present application as shown in FIG. 1a, the frame-level speech feature sequence can be divided into n blocks according to time sequentially, and each block includes a master block Ai and a corresponding slave block Bi, wherein I is a value falling within a range of $1 \le i \le n$, and the frame-level speech feature sequence is divided in a sequence from the master block A1 to the master block An according to time, and both of the master block Ai and the corresponding slave block Bi include a plurality of frame speech feature information. For example, the first block includes a master block A1 and a slave block B1, the second block includes a master block A2 and a slave block B2, . . . and the $n^{th}$ block includes a master block An and a slave block Bn.

Figure 1B:
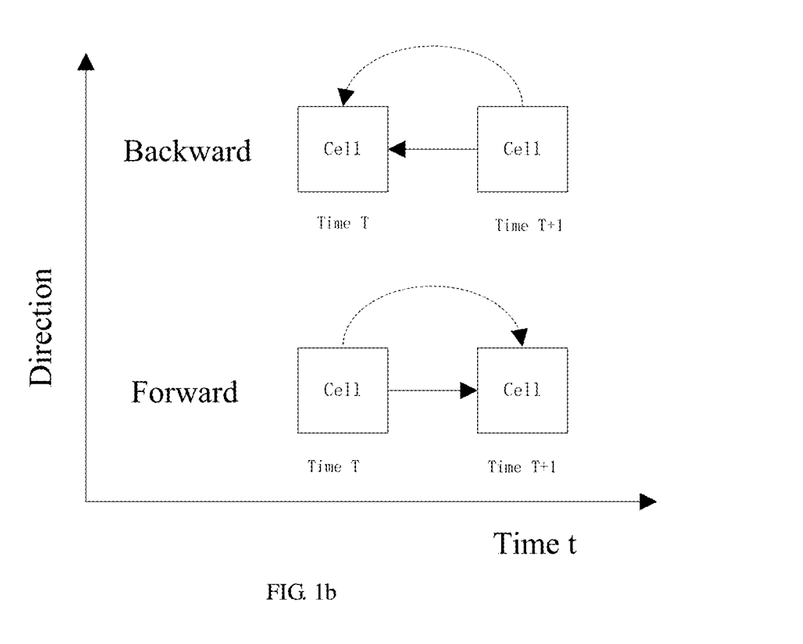
FIG. 1b is a schematic view showing the recognition direction of speech-information-to-be-tested in accordance with an embodiment of the present application.

S103: Input all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block In an embodiment of the present application, all blocks are inputted into the preset bidirectional LSTM-RNN model parallelly. In FIG. 1b, since the speech-information-to-be-tested is related to time in the preset bidirectional LSTM-RNN model, and each frame of speech feature information in the frame-level speech feature sequence corresponds to a corresponding time t, therefore when the forward recognition is carried out, the forward recognition can be carried out from the speech feature information corresponding to the time T to the speech feature information corresponding to the time T+1. After the recognition ends, a backward recognition of the speech feature information is carried out immediately from the speech feature information corresponding to the time T+1 to the corresponding to the time T, so as to improve the accuracy of the speech information recognition significantly and also reduce the delay time of the speech recognition effectively.

Inputting all blocks into the preset bidirectional LSTM-RNN model parallelly refers to the input of all blocks into the neuron of the input layer of the preset bidirectional LSTM-RNN model according to time sequentially, wherein each block corresponds to a neuron of an input layer, and the master block of each block is processed with the forward recognition by the neuron of the input layer and then by the neuron of the hidden layer of the preset bidirectional LSTM-RNN model. After the forward recognition is completed, the backward recognition of each block is carried out by the neuron of the input layer and then by the neuron of the hidden layer of the preset bidirectional LSTM-RNN model, wherein the first-frame speech feature information processed with the backward recognition is the last-frame speech feature information in the slave block.

For example, when the master block A1 of the first block enters into and passes through preset bidirectional LSTM-RNN model, the forward recognition is carried by the neuron of the hidden layer of the preset bidirectional LSTM-RNN model to obtain a forward recognition result, and then it is necessary to perform the backward recognition by inputting the speech feature information of the whole first block in a reverse direction starting from the last-frame speech feature information of the slave block B1 into the neuron of the hidden layer of the preset bidirectional LSTM-RNN model to obtain a backward recognition result. Similarly, other blocks inputted into the preset bidirectional LSTM-RNN model parallelly can be processed with the corresponding forward recognition and backward recognition to achieve the effect of a real-time speech recognition.

Figure 4:
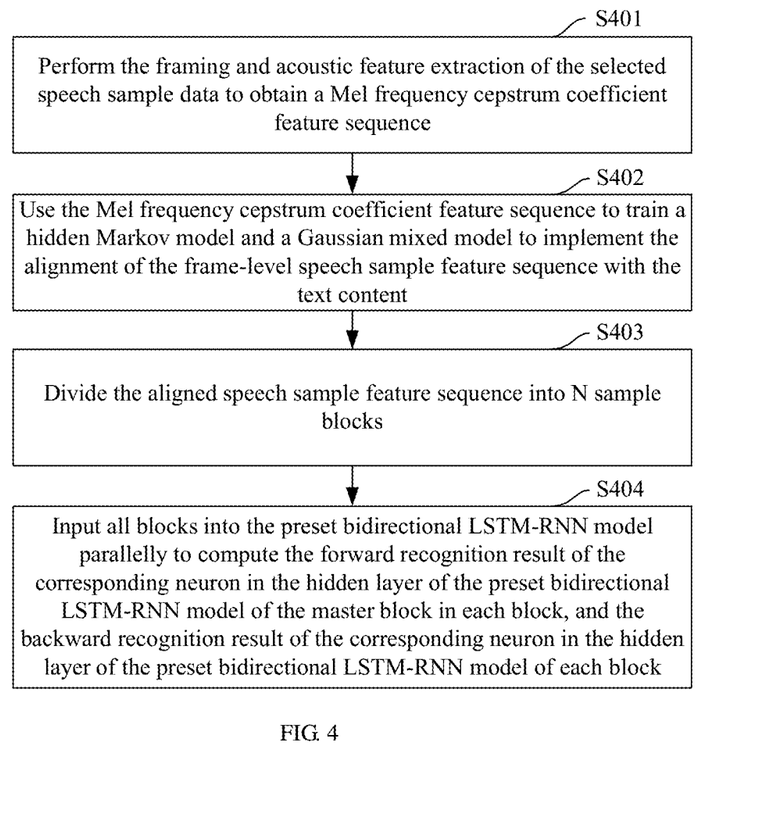
FIG. 4 is another flow chart of a speech recognition method in accordance with an embodiment of the present application.

Further, the construction of the preset bidirectional LSTM-RNN model as shown in FIG. 4 comprises the following steps S401~S404.

S401: Perform the framing and acoustic feature extraction of the selected speech sample data to obtain a Mel frequency cepstrum coefficient feature sequence. Wherein, after the framing of the selected speech sample data is performed, each speech frame is processed with a fast Fourier transform to convert a voice signal of a time domain into an energy spectrum of a frequency domain for analysis, and then the energy spectrum is passed through a Mel-scale triangular filter bank, and a formant feature of prominent voice, and then the logarithmic energy outputted by each filter bank is calculated. After the logarithmic energy is calculated, a discrete cosine transform is carried out to obtain a Mel frequency cepstrum coefficient feature sequence.

S402: Use the Mel frequency cepstrum coefficient feature sequence to train a hidden Markov model and a Gaussian mixed model to implement the alignment of the frame-level speech sample feature sequence with the text content, wherein the hidden Markov model corresponds to the speech sample data one by one, and the Gaussian mixed model is provided for describing an output probability distribution status of the hidden Markov model. Specifically, the text content is the content contained in a text file corresponding to the selected speech sample data. The implantation of the alignment of the frame-level speech sample feature sequence with the text content refers to the alignment of an implementation status with a phoneme level.

Firstly, the inputted Mel frequency cepstrum coefficient feature sequence is normalized, and the normalization of the variance is default. A quick start is carried out in order to use a small amount of feature data to obtain initialized hidden Markov model and Gaussian mixed model and decision tree quickly; and then a network for training is constructed, wherein a phoneme level FST network is contrasted for decoding each sentence. In a training process, the feature sequence is aligned continuously, and the training is carried out repeatedly to obtain a median statistic, wherein the statistic of the hidden Markov model is the frequency of two phonemes showing up at the interconnected edge of the FST network, and the statistic of the Gaussian model is the cumulative feature value or each probability density function pdf-id and the cumulative feature square value, and the statistic is related to the update of the variance and mean of the Gaussian model. By updating the model continuously to complete the training of the decoding network, the training of the monophone model can be achieved. Finally, a compulsion alignment is performed to decode an output result or carry out the training of the model for the next stage.

In a certain embodiment, after the monophone model is trained, the speech recognition process of a complete hidden Markov model and a complete Gaussian mixed model still requires several times of training of the triphone model, and the triphone model trains and considers the influence of the related phonemes in front of and behind the current phoneme in order to obtain a more accurate alignment effect or produce a better recognition result. According to different features and effects, the triphone model generally adopts a context-based (delta+delta-delta, $\Delta+\Delta\Delta$) feature, a linear discriminant analysis and a maximum likelihood linear transformation (linear discriminant analysis+maximum likelihood linear transform, LDA+MLLT) and a speaker adaptive training+feature space maximum likelihood linear regression, SAT+fMLLR) triphone feature model for training.

The triphone model based on the delta+delta-delta feature adds a delta feature to the original Mel frequency cepstrum coefficient feature for the model training. If the inputted original Mel frequency cepstrum coefficient feature is 13 dimensions, the input feature after the delta+delta-delta feature is added becomes 39 dimensions. The triphone model based on the linear discriminant analysis and maximum likelihood linear transformation performs a frame overlay of the enhanced delta+delta-delta feature data and increases the feature dimension, and then reduces the dimension by the linear discriminant analysis for a feature change, and a model training of the triphone is performed. The triphone feature model based on SAT+fMLLR feature requires an original training data sample that cannot be affected by the phonetic intonation of the speaker and environmental factors. Therefore, not much details regarding the speech input by the same speaker in different environments are described, and practical applications are less. In a certain embodiment, the monophone training, the triphone training based on delta+delta-delta feature, the triphone training based on delta+delta-delta feature and the linear discriminant analysis+maximum likelihood linear transformation are mainly used for training, and the hidden Markov model and the Gaussian mixed model are mainly used for the training and alignment in automatic speech recognition.

In a general framework used for training the bidirectional LSTM-RNN model, the hidden Markov model and the Gaussian mixed model are trained first for the compulsory alignment, and it can be done for one or more times, and then the compulsory alignment result is combined with the input feature of the original speech sample which is used as a training sample of the bidirectional LSTM-RNN for the training. Researches indicate that the trained bidirectional LSTM-RNN model based on the hidden Markov model and the Gaussian mixed model can decrease the error rate of the speech recognition. For example, the error rate can be reduced by 20%~30%.

S403: Divide the aligned speech sample feature sequence into n sample blocks, wherein n is an integer greater than or equal to 2, and each sample block includes a master block, and each master block is coupled to the slave block, and both of the master block and the corresponding slave block include the plurality of frame speech feature information, and the last-frame speech feature information of the master block is disposed adjacent to the first-frame speech feature information of the slave block In an embodiment of the present application as shown in FIG. 1a, both of the forward and backward calculations of the neural network model adopt chunks to read the frame-level speech feature sequence. Firstly, the frame-level speech feature sequence is divided into a plurality of equidistant master blocks without overlap according to the fixed frame length (reading while cutting). In the reverse calculation, the speech feature information of fixed frame length are combined and appended to the back of each master block, and the speech feature information with the fixed frame length are combined to form a corresponding slave block, and each master block and its corresponding slave block constitute a block. During the process of training the bidirectional LSTM-RNN, the subsequent combined speech feature information will not produce any output, so that the calculation of the original master block will not generate any additional error. Compared with the traditional bidirectional LSTM-RNN training in a testing environment that requires reading the whole speech first, the training speed of the application can be improved by more than ten times.

During the decoding process, the initial state of the forward memory unit at the time T can be obtained by computing the master block at the time T−1, and the initial state of the backward memory unit at the time T can be obtained by computing the slave block with the fixed frame length after being combined with the master block. Therefore, the time delay of the decoding application is just determined by the speech feature information in the slave block. As a result, the total time spent for the speech recognition can be reduced. It no longer needs to wait until the whole speech-information-to-be-tested has been read before starting the calculation, and it just needs to wait for the time duration occupied by the slave block only, so that the speech recognition with the bidirectional LSTM-RNN application becomes possible. In the meantime, several speeches may be combined into mini-batches for the training, in order to reduce the memory consumption of the calculation. In addition, the application has the effect of improving the accuracy of the speech recognition, and providing a highly practical use and a good scalability.

S404: Input all blocks into the preset bidirectional LSTM-RNN model parallelly to compute the forward recognition result of the corresponding neuron in the hidden layer of the preset bidirectional LSTM-RNN model of the master block in each block, and the backward recognition result of the corresponding neuron in the hidden layer of the preset bidirectional LSTM-RNN model of each block.

In an embodiment of the present application, the forward training process of the bidirectional LSTM-RNN is the same as that of the unidirectional LSTM-RNN, both of them cover related "history" information of all input frames. In the backward training process, it is necessary to use the aforementioned steps together with the speech frame carrying the "future" information in order to reduce the time delay produced when the information of the whole sentence is read in the reverse direction.

For example, a 3~5-layer LSTM-RNN model is adopted, and a compulsory alignment of the output of the model is performed, and the compulsory alignment result is sent into the bidirectional LSTM-RNN, and finally decoded and outputted. In the meantime, the bidirectional LSTM-RNN model is obtained. Specifically, the master sample block in each sample block performs a forward training of the bidirectional LSTM-RNN. Each sample block performs a backward training of the bidirectional LSTM-RNN to obtain a preset bidirectional LSTM-RNN model, and each block is inputted into the bidirectional LSTM-RNN parallelly for training. The time delay produced during the training in the reverse direction is just the time consumed for training each slave block only, so that the time consumed in the whole training process is reduced greatly.

For example, the time delay controlled structure of the bidirectional LSTM-RNN model may be as follows: Each hidden layer of the model has 1024 neurons, wherein the forward recognition involves 512 neurons, and the backward recognition involves 512 neurons, and the back of the hidden layer has a projection layer containing 300 neurons, and the last output layer is a Softmax layer. All neurons are initialized uniformly by a random weight in an interval of [−0.05~0.05], and the initial offset is 0. The training of the neural network adopts a cross-entropy criteria, and a truncated back-propagation-through-time optimal training method. Wherein, each recognizable block in the model may include 20 frames of speech information, and each mini-batch includes 40 pronunciation sentences. In the choice of momentum factor, the first epoch is 0, and the repeated operation adopts 0.9. In learning rate updates, if the repeated operation is not increased this time, then the learning rate of the previous iteration will be halved and such result will be used as the learning rate for the next repeated operation training.

S104: Obtain an output result of the corresponding neuron in an output layer of the preset bidirectional LSTM-RNN model corresponding to the forward recognition result and backward recognition result of each block to obtain a speech recognition result of the speech-information-to-be-tested. Wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

In an embodiment of the present application, an output of the corresponding neurons of the output layer in the preset bidirectional LSTM-RNN model is carried out according to the corresponding forward recognition result and backward recognition result of each block, so as to obtain an output result which is the speech recognition result. This embodiment of the present application can reduce the time delay of the decoding effectively, and thus making the application of the real-time speech recognition based on the bidirectional LSTM-RNN possible.

Figure 5:
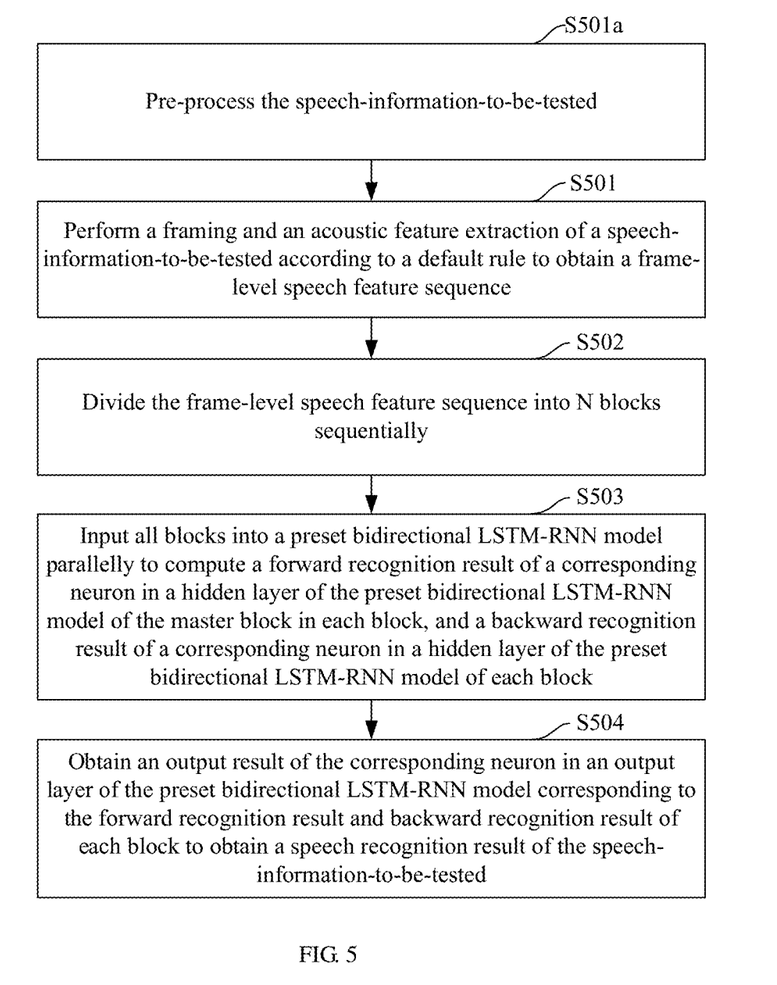
FIG. 5 is a flow chart of a speech recognition method in accordance with another embodiment of the present application.

With reference to FIG. 5 for a flow chart of a speech recognition method in accordance with another embodiment of the present application, the method comprises the following steps S501a~S504.

S501a: Pre-process the speech-information-to-be-tested.

In an embodiment of the present application, a pre-emphasis of the speech-information-to-be-tested is performed to improve the high-frequency portion of the speech-information-to-be-tested, so as to make the spectrum smoother, and then a winding of the framing is performed to convert a non-stationary voice signal into a short-time stationary signal for analysis and processing. An endpoint detection, a distinction between speech and noise, and an extraction of valid speech portion are carried out to improve the recognition accuracy of the speech-information-to-be-tested.

S501: Perform a framing and an acoustic feature extraction of a speech-information-to-be-tested according to a default rule to obtain a frame-level speech feature sequence.

S502: Divide the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block S503: Input all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block.

S504: Obtain an output result of the corresponding neuron in an output layer of the preset bidirectional LSTM-RNN model corresponding to the forward recognition result and backward recognition result of each block to obtain a speech recognition result of the speech-information-to-be-tested;

Wherein, the preset bidirectional LSTM-RNN model comprises an input layer composed of the corresponding neurons of all blocks, a hidden layer composed of a non-linear mapping unit, and an output layer composed of the neuron corresponding to the output result of the hidden layer.

Figure 6:
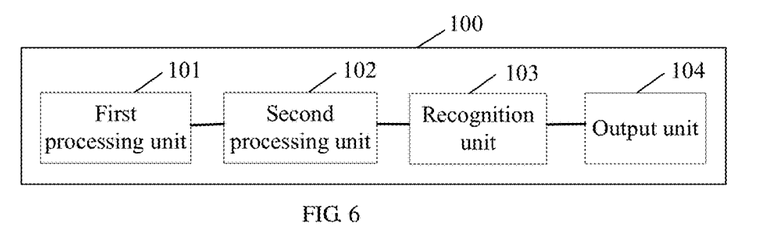
FIG. 6 is a schematic block diagram of a speech recognition apparatus in accordance with an embodiment of the present application.

With reference to FIG. 6 for a speech recognition apparatus in accordance with an embodiment of the present application which corresponds to the aforementioned speech recognition method, the apparatus 100 comprises a first processing unit 101, a second processing unit 102, a recognition unit 103, and an output unit 104.

The first processing unit 101 is provided for performing a framing and an acoustic feature extraction of a speech information to be tested according to a default rule to obtain a frame-level speech feature sequence.

Figure 7:
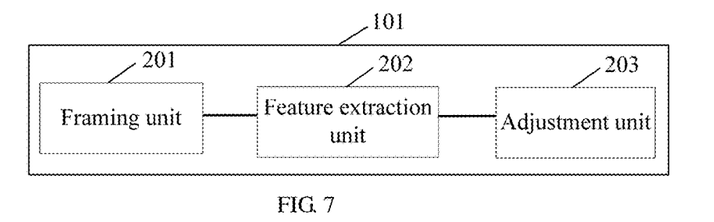
FIG. 7 is another schematic block diagram of a speech recognition apparatus in accordance with an embodiment of the present application.

In FIG. 7, the first processing unit 101 further comprises a framing unit 201, a feature extraction unit 202, and an adjustment unit 203. Wherein, the framing unit 201 is provided for performing the framing of the speech-information-to-be-tested to obtain a plurality of speech frames. The feature extraction unit 202 is provided for performing the feature extraction of each speech frame to obtain a Mel frequency cepstrum coefficient feature sequence corresponding to each speech frame. The adjustment unit 203 is provided for inputting the Mel frequency cepstrum coefficient feature sequence into the preset phoneme model to obtain an aligned frame-level speech feature sequence.

Figure 8:
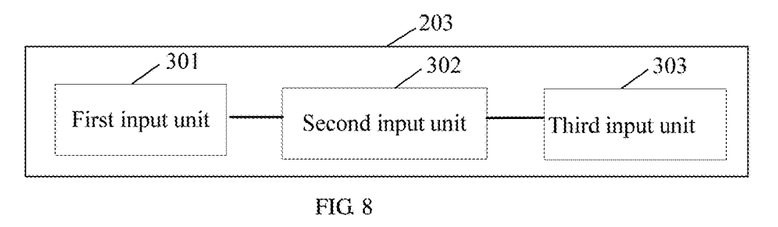
FIG. 8 is another schematic block diagram of a speech recognition apparatus in accordance with an embodiment of the present application.

In FIG. 8, the adjustment unit 203 further comprises a first input unit 301, a second input unit 302 and a third input unit 303. The first input unit 301 is provided for inputting the Mel frequency cep strum coefficient feature sequence into the preset monophone model to obtain an aligned first feature information. The second input unit 302 is provided for inputting the first feature information into the preset context triphone model to obtain an aligned second feature information. The third input unit 303 is provided for inputting the second feature information into the preset triphone model based on the linear discriminant analysis and the maximum likelihood linear transformation to obtain an aligned frame-level speech feature sequence. Wherein, the monophone model, the context triphone model and the triphone model based on the linear discriminant analysis and the maximum likelihood linear transformation are different preset hidden Markov models and Gaussian mixed models.

The second processing unit 102 is provided for dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block.

The recognition unit 103 is provided for inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block.

The output unit 104 is provided for obtaining an output result of the corresponding neuron in an output layer of the preset bidirectional LSTM-RNN model corresponding to the forward recognition result and backward recognition result of each block to obtain a speech recognition result of the speech information to be tested Wherein, the preset bidirectional LSTM-RNN model comprises an input layer composed of the corresponding neurons of all blocks, a hidden layer composed of a non-linear mapping unit, and an output layer composed of the neuron corresponding to the output result of the hidden layer.

In summation of the description above, the embodiment of the present application reduces the time delay of decoding effectively to make the application of real-time speech recognition based on the bidirectional LSTM-RNN possible. The apparatus of this embodiment of the present application corresponds to the method of the aforementioned embodiment, so that the description of related analysis and principle will not be repeated.

Figure 9:
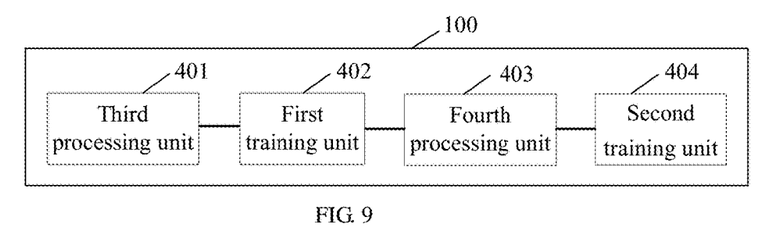
FIG. 9 is another schematic block diagram of a speech recognition apparatus in accordance with an embodiment of the present application.

In FIG. 9, the apparatus 100 further comprises a third processing unit 401, a first training unit 402, a fourth processing unit 403 and a second training unit 404 used for the construction of the preset bidirectional LSTM-RNN model.

Wherein, the third processing unit 401 is provided for performing the framing and an acoustic feature extraction of the selected speech sample data to obtain the Mel frequency cepstrum coefficient feature sequence. The first training unit 402 is provided for using the Mel frequency cepstrum coefficient feature sequence to train the hidden Markov model and Gaussian mixed model to implement the alignment of the frame-level speech sample feature sequence with the text content, wherein the hidden Markov model corresponds to the speech sample data one by one, and the Gaussian mixed model is provided for describing an output probability distribution status of the hidden Markov model. The fourth processing unit 403 is provided for dividing the aligned speech sample feature sequence into n sample blocks, wherein n is an integer greater than or equal to 2, and each sample block includes a master block, and each master block is coupled to the slave block, and both of the master block and the corresponding slave block include the plurality of frame speech feature information, and the last-frame speech feature information of the master block is disposed adjacent to the first-frame speech feature information of the slave block. The second training unit 404 is provided for inputting all blocks into the preset bidirectional LSTM-RNN model parallelly to compute the forward recognition result of the corresponding neuron in the hidden layer of the preset bidirectional LSTM-RNN model of the master block in each block, and the backward recognition result of the corresponding neuron in the hidden layer of the preset bidirectional LSTM-RNN model of each block to obtain the preset bidirectional LSTM-RNN model.

Figure 10:
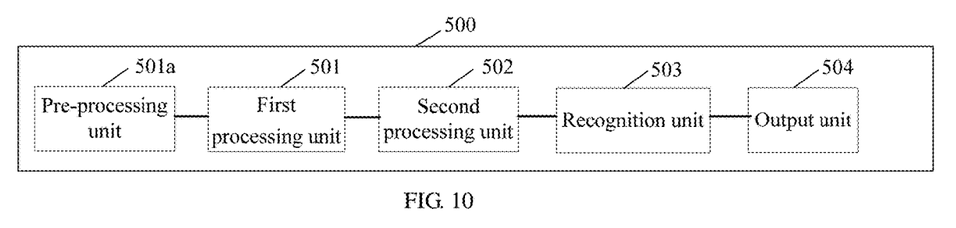
FIG. 10 is a schematic block diagram of a speech recognition apparatus in accordance with another embodiment of the present application.

With reference to FIG. 10 for a speech recognition apparatus in accordance with another embodiment of the present application, the speech recognition apparatus 500 corresponds to the aforementioned speech recognition method and comprises a pre-processing unit 501a, a first processing unit 501, a second processing unit 502, a recognition unit 503 and an output unit 504.

The pre-processing unit 501a is provided for pre-processing the speech-information-to-be-tested. The first processing unit 501 is provided for performing a framing and an acoustic feature extraction of a speech-information-to-be-tested according to a default rule to obtain a frame-level speech feature sequence. The second processing unit 502 is provided for dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block. The recognition unit 503 is provided for inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block. The output unit 504 is provided for obtaining an output result of the corresponding neuron in an output layer of the preset bidirectional LSTM-RNN model corresponding to the forward recognition result and backward recognition result of each block to obtain a speech recognition result of the speech-information-to-be-tested Wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

Figure 11:
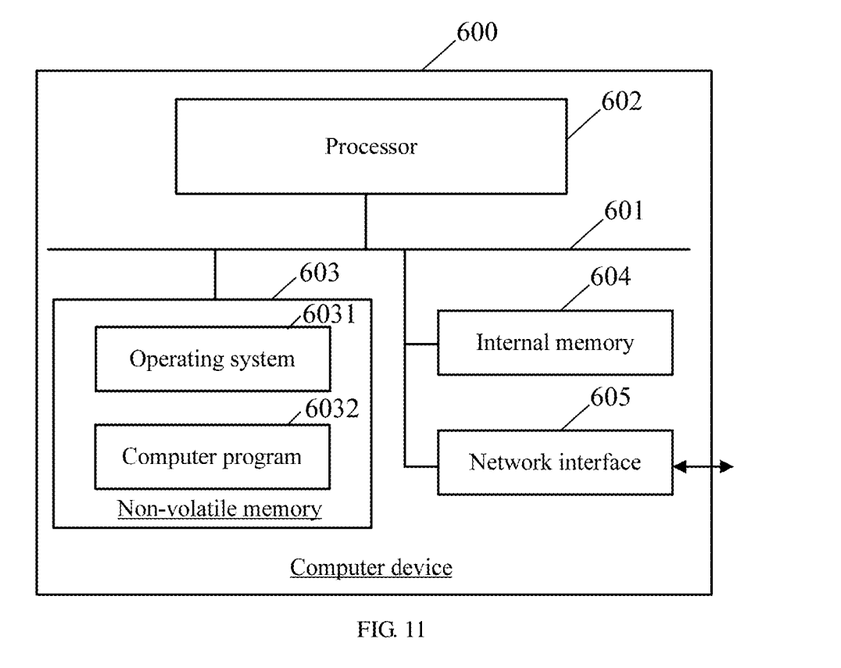
FIG. 11 is a schematic block diagram showing the structure of a speech recognition apparatus in accordance with an embodiment of the present application.

The aforementioned speech recognition apparatus may be in form of a computer program, and the computer program can be operated in a computer device as shown in FIG. 11. FIG. 11 is a schematic view showing the structure of a speech recognition device of the present application, the apparatus is a terminal or a server, wherein the terminal includes but not limited to an electronic device with a communication function such as a smart phone, a table PC, a notebook computer, a desktop computer, a personal digital assistant and a wearable device. The server may be an standalone server or a server cluster composed of a plurality of servers.

In FIG. 11, the computer device 600 comprises a processor 602, a non-volatile storage medium 603, an internal memory 604 and a network interface 605 coupled to each other by a system bus 601. Wherein, the non-volatile storage medium 603 of the computer device 600 is capable of storing an operating system 6031 and a computer program 6032, so that when the computer program 6032 is executed, the processor 602 executes a speech recognition method. The processor 602 of the computer device 600 is for providing a computing and controlling capability to support the operation of the whole computer device 600. The internal memory 604 provides an environment for the operation of the computer program stored in the non-volatile storage medium, so that when the computer program is executed by the processor, the processor 602 executes the speech recognition method of the aforementioned embodiment. The network interface 605 of the computer device 600 is provided for network communications such as transmission, distribution, etc. People having ordinary skill in the art can understand that the structure as depicted in FIG. 11 (schematic block diagram) just illustrates the related parts of the present application only, but does not limit the computer device applied to the present application. Specifically, the computer device may have more or less parts, a combination of certain parts, or a layout with different parts compared with those as shown in the figure.

The present application further provides a computer readable storage medium, and the computer readable storage medium stores one or more programs which are executed by one or more processors to achieve the speech recognition method in accordance with an embodiment of the aforementioned embodiment.

The storage medium of the present application is a floppy disk, an optical disk, a read-only memory (ROM), and any other medium capable of storing program codes. The unit of all embodiments of the present application may be a universal integrated circuit such as a Central Processing Unit (CPU) or an Application Specific Integrated Circuit (ASIC). The steps of the speech recognition method in accordance with the embodiments of the present application may be adjusted, combined and deleted according to actual requirements, and the units in the speech recognition terminal may be combined, divided, or deleted according to actual requirements.

While the application has been described by means of specific embodiments, numerous modifications and variations could be made thereto by those skilled in the art without departing from the scope and spirit of the application set forth in the claims.

What is claimed is:

1. A speech recognition method, comprising:
performing a framing and an acoustic feature extraction of a speech-information-to-be-tested according to a default rule to obtain a frame-level speech feature sequence;
dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block;
inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block; and
obtaining an output result of the corresponding neuron in an output layer of the preset bidirectional LSTM-RNN model corresponding to the forward recognition result and backward recognition result of each block to obtain a speech recognition result of the speech-information-to-be-tested;
wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

2. The method as claimed in claim 1, wherein the step of performing the framing and acoustic feature extraction of the speech-information-to-be-tested according to the default rule to obtain the frame-level speech feature sequence further comprises the steps of:
performing the framing of the speech-information-to-be-tested to obtain a plurality of speech frames;
performing the feature extraction of each speech frame to obtain a Mel frequency cepstrum coefficient feature sequence corresponding to each speech frame; and
inputting the Mel frequency cepstrum coefficient feature sequence into a preset phoneme model to obtain an aligned frame-level speech feature sequence.

3. The method as claimed in claim 2, wherein the step of inputting the Mel frequency cepstrum coefficient feature sequence into the preset phoneme model to obtain the aligned frame-level speech feature sequence further comprises the steps of:
inputting the Mel frequency cepstrum coefficient feature sequence into the preset monophone model to obtain an aligned first feature information;
inputting the first feature information into a preset context triphone model to obtain an aligned second feature information; and
inputting the second feature information into a preset triphone model based on a linear discriminant analysis and a maximum likelihood linear transformation to obtain an aligned frame-level speech feature sequence;
wherein, the monophone model, the context triphone model and the triphone model based on the linear discriminant analysis and the maximum likelihood linear transformation are different preset hidden Markov models and Gaussian mixed models.

4. The method as claimed in claim 2, wherein the preset bidirectional LSTM-RNN model has a construction comprising:
performing the framing and an acoustic feature extraction of the selected speech sample data to obtain the Mel frequency cepstrum coefficient feature sequence;
using the Mel frequency cepstrum coefficient feature sequence to train the hidden Markov model and Gaussian mixed model to implement the alignment of the frame-level speech sample feature sequence with the text content, wherein the hidden Markov model corresponds to the speech sample data one by one, and the Gaussian mixed model is provided for describing an output probability distribution status of the hidden Markov model;
dividing the aligned speech sample feature sequence into n sample blocks, wherein n is an integer greater than or equal to 2, and each sample block includes a master block, and each master block is coupled to the slave block, and both of the master block and the corresponding slave block include the plurality of frame speech feature information, and the last-frame speech feature information of the master block is disposed adjacent to the first-frame speech feature information of the slave block; and
inputting all blocks into the preset bidirectional LSTM-RNN model parallelly to compute the forward recognition result of the corresponding neuron in the hidden layer of the preset bidirectional LSTM-RNN model of the master block in each block, and the backward recognition result of the corresponding neuron in the hidden layer of the preset bidirectional LSTM-RNN model of each block.

5. The method as claimed in claim 1, further comprising the step of pre-processing the speech-information-to-be-tested;
wherein, the framing and the acoustic feature extraction of the speech-information-to-be-tested pre-processed according to the default rule are performed to obtain the frame-level speech feature sequence.

6. A speech recognition device, comprising:
a memory, for storing a program to achieve a speech recognition; and
a processor, for executing the program stored in the memory to achieve the speech recognition by performing the operations of:
performing a framing and an acoustic feature extraction of a speech-information-to-be-tested according to a default rule to obtain a frame-level speech feature sequence;
dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block; inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block; and
obtaining an output result of the corresponding neuron in an output layer of the preset bidirectional LSTM-RNN model corresponding to the forward recognition result and backward recognition result of each block to obtain a speech recognition result of the speech-information-to-be-tested;
wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

7. The device as claimed in claim 6, wherein the step of performing the framing and acoustic feature extraction of the speech-information-to-be-tested according to the default rule to obtain the frame-level speech feature sequence further comprises the steps of:
performing the framing of the speech-information-to-be-tested to obtain a plurality of speech frames;
performing the feature extraction of each speech frame to obtain a Mel frequency cepstrum coefficient feature sequence corresponding to each speech frame; and
inputting the Mel frequency cepstrum coefficient feature sequence into a preset phoneme model to obtain an aligned frame-level speech feature sequence.

8. The device as claimed in claim 7, wherein the step of inputting the Mel frequency cepstrum coefficient feature sequence into the preset phoneme model to obtain the aligned frame-level speech feature sequence further comprises the steps of:
inputting the Mel frequency cepstrum coefficient feature sequence into the preset monophone model to obtain an aligned first feature information;
inputting the first feature information into a preset context triphone model to obtain an aligned second feature information; and
inputting the second feature information into a preset triphone model based on a linear discriminant analysis and a maximum likelihood linear transformation to obtain an aligned frame-level speech feature sequence;
wherein, the monophone model, the context triphone model and the triphone model based on the linear discriminant analysis and the maximum likelihood linear transformation are different preset hidden Markov models and Gaussian mixed models.

9. The device as claimed in claim 7, wherein the preset bidirectional LSTM-RNN model has a construction comprising:
performing the framing and an acoustic feature extraction of the selected speech sample data to obtain the Mel frequency cepstrum coefficient feature sequence;
using the Mel frequency cepstrum coefficient feature sequence to train the hidden Markov model and Gaussian mixed model to implement the alignment of the frame-level speech sample feature sequence with the text content, wherein the hidden Markov model corresponds to the speech sample data one by one, and the Gaussian mixed model is provided for describing an output probability distribution status of the hidden Markov model;
dividing the aligned speech sample feature sequence into n sample blocks, wherein n is an integer greater than or equal to 2, and each sample block includes a master block, and each master block is coupled to the slave block, and both of the master block and the corresponding slave block include the plurality of frame speech feature information, and the last-frame speech feature information of the master block is disposed adjacent to the first-frame speech feature information of the slave block;

inputting all blocks into the preset bidirectional LSTM-RNN model parallelly to perform a forward training of the bidirectional LSTM-RNN through the master sample in each sample block, and to perform a backward training of the bidirectional LSTM-RNN through the master sample block in each sample block to obtain a preset bidirectional LSTM-RNN model.

10. The device as claimed in claim 6, wherein the processor further executes the operation of pre-processing the speech-information-to-be-tested;

wherein the framing and the acoustic feature extraction of the speech-information-to-be-tested pre-processed according to the default rule are performed to obtain the frame-level speech feature sequence.

11. A non-transitory computer readable storage medium, for storing one or more programs executed by one or more processors to implement the steps of:

performing a framing and an acoustic feature extraction of a speech-information-to-be-tested according to a default rule to obtain a frame-level speech feature sequence;

dividing the frame-level speech feature sequence into n blocks sequentially, wherein n is an integer greater than or equal to 2, and each block includes a master block, and each master block is coupled to a slave block, and both of the master block and the corresponding slave block include a plurality of frame speech feature information, and a last-frame speech feature information of the master block is disposed adjacent to a first-frame speech feature information of the slave block;

inputting all blocks into a preset bidirectional LSTM-RNN model parallelly to compute a forward recognition result of a corresponding neuron in a hidden layer of the preset bidirectional LSTM-RNN model of the master block in each block, and a backward recognition result of a corresponding neuron in a hidden layer of the preset bidirectional LSTM-RNN model of each block;

obtaining an output result of the corresponding neuron in an output layer of the preset bidirectional LSTM-RNN model corresponding to the forward recognition result and backward recognition result of each block to obtain a speech recognition result of the speech-information-to-be-tested;

wherein, the preset bidirectional LSTM-RNN model comprises an input layer composed of the corresponding neurons of all blocks, a hidden layer composed of a nonlinear mapping unit, and an output layer composed of the neuron corresponding to the output result of the hidden layer.

12. The non-transitory computer readable storage medium as claimed in claim 11, wherein the step of performing the framing and acoustic feature extraction of the speech-information-to-be-tested according to the default rule to obtain the frame-level speech feature sequence further comprises the steps of:

performing the framing of the speech-information-to-be-tested to obtain a plurality of speech frames;

performing the feature extraction of each speech frame to obtain a Mel frequency cepstrum coefficient feature sequence corresponding to each speech frame; and inputting the Mel frequency cepstrum coefficient feature sequence into a preset phoneme model to obtain an aligned frame-level speech feature sequence.

13. The non-transitory computer readable storage medium as claimed in claim 12, wherein the step of inputting the Mel frequency cepstrum coefficient feature sequence into the preset phoneme model to obtain the aligned frame-level speech feature sequence further comprises the steps of:

inputting the Mel frequency cepstrum coefficient feature sequence into the preset monophone model to obtain an aligned first feature information;

inputting the first feature information into a preset context triphone model to obtain an aligned second feature information; and inputting the second feature information into a preset triphone model based on a linear discriminant analysis and a maximum likelihood linear transformation to obtain an aligned frame-level speech feature sequence;

wherein, the monophone model, the context triphone model and the triphone model based on the linear discriminant analysis and the maximum likelihood linear transformation are different preset hidden Markov models and Gaussian mixed models.

14. The non-transitory computer readable storage medium as claimed in claim 12, wherein the preset bidirectional LSTM-RNN model has a construction comprising:

performing the framing and an acoustic feature extraction of the selected speech sample data to obtain the Mel frequency cepstrum coefficient feature sequence;

using the Mel frequency cepstrum coefficient feature sequence to train the hidden Markov model and Gaussian mixed model to implement the alignment of the frame-level speech sample feature sequence with the text content, wherein the hidden Markov model corresponds to the speech sample data one by one, and the Gaussian mixed model is provided for describing an output probability distribution status of the hidden Markov model;

dividing the aligned speech sample feature sequence into n sample blocks, wherein n is an integer greater than or equal to 2, and each sample block includes a master block, and each master block is coupled to the slave block, and both of the master block and the corresponding slave block include the plurality of frame speech feature information, and the last-frame speech feature information of the master block is disposed adjacent to the first-frame speech feature information of the slave block; and inputting all blocks into the preset bidirectional LSTM-RNN model parallelly, performing a forward training of the bidirectional LSTM-RNN through the master sample block in each sample block, and performing a backward training of the bidirectional LSTM-RNN in each sample block to obtain a preset bidirectional LSTM-RNN model.

15. The non-transitory computer readable storage medium as claimed in claim 11, further comprising the step of pre-processing the speech-information-to-be-tested;

wherein, the framing and the acoustic feature extraction of the speech-information-to-be-tested pre-processed according to the default rule are performed to obtain the frame-level speech feature sequence.

* * * * *